United States Patent [19]
Farrell

[11] 3,883,951
[45] May 20, 1975

[54] LONG HANDLED SHEARS
[75] Inventor: Theodore Farrell, Pomona, N.Y.
[73] Assignee: Lawrence Peska Associates, Inc., New York, N.Y.
[22] Filed: Aug. 7, 1974
[21] Appl. No.: 495,442

[52] U.S. Cl. ................ 30/226; 30/257; 30/341
[51] Int. Cl. ........................................ B26b 13/08
[58] Field of Search ............ 30/254, 257, 260, 341, 30/226

[56] References Cited
UNITED STATES PATENTS

| | | | |
|---|---|---|---|
| 78,615 | 6/1868 | Spear | 30/341 X |
| 131,108 | 9/1872 | McElhaney | 30/254 |
| 137,760 | 4/1873 | Cady | 30/254 |
| 506,568 | 10/1893 | Townsend | 30/226 |
| 2,980,995 | 4/1961 | Booth | 30/226 X |
| 3,055,107 | 9/1962 | Carlberg | 30/341 X |

FOREIGN PATENTS OR APPLICATIONS

| | | | |
|---|---|---|---|
| 11,092 | 9/1885 | United Kingdom | 30/341 |
| 213,663 | 7/1956 | Australia | 30/257 |

Primary Examiner—Donald G. Kelly
Assistant Examiner—J. C. Peters

[57] ABSTRACT

A long handled cutting instrument used for the cutting of high branches on a tree as well as trimming around the garden. The long handled cutting instrument comprises a cutting blade and jaw pivotally mounted to each other by a stationary fulcrum pin. The outer ends of the cutting blade and jaw are beveled outward from the longitudinal axis of the butt ends of the cutting blade and jaw. An elongated handle is detachably mounted onto the butt ends of the cutting blade and jaw.

10 Claims, 7 Drawing Figures

PATENTED MAY 20 1975    3,883,951
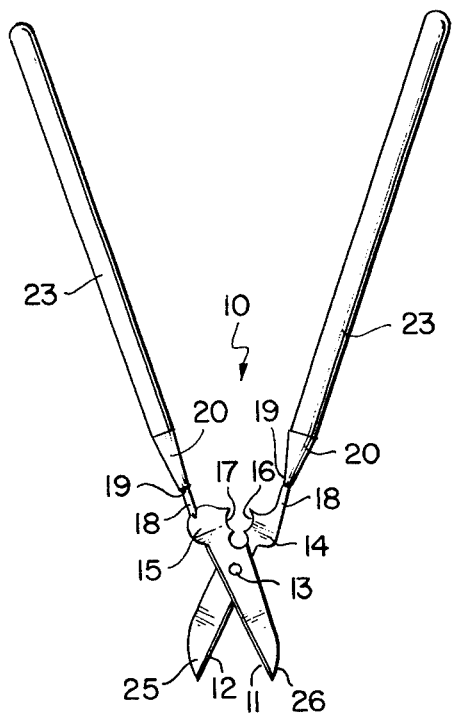
FIG. 1
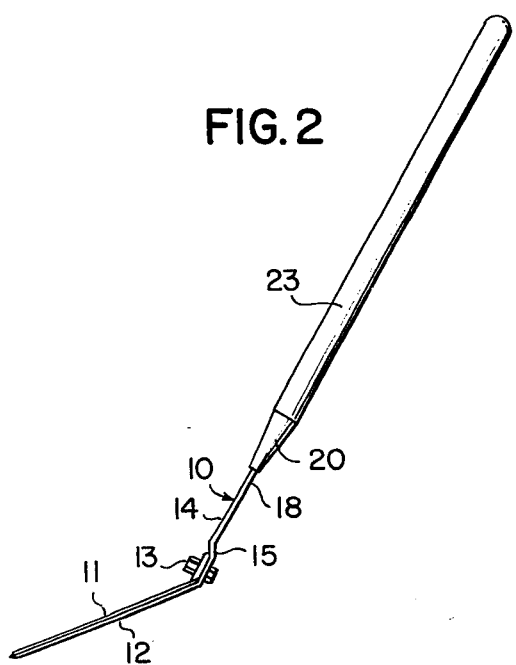
FIG. 2
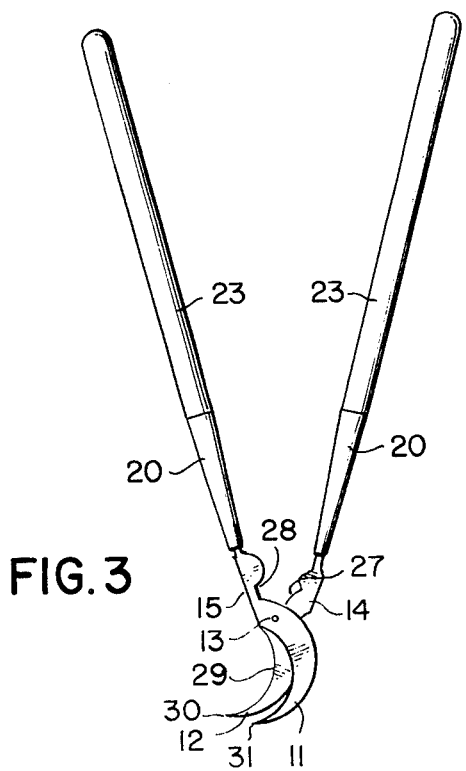
FIG. 3
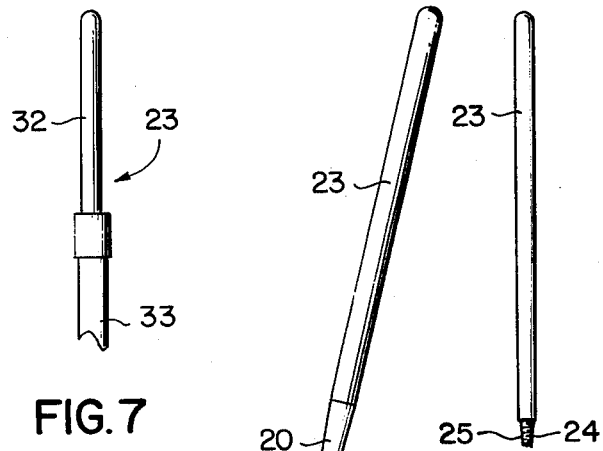
FIG. 4
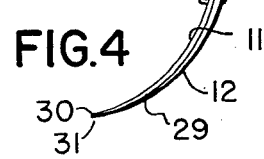
FIG. 7
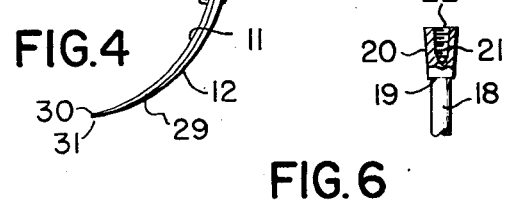
FIG. 5
FIG. 6

LONG HANDLED SHEARS

SUMMARY OF THE INVENTION

It is known from U.S. Pat. Nos. 51,497; 96,294; 291,966; 1,196,278; and 2,528,816 that improvements have been made in optimizing the cutting action of the jaw and cutting blade. However, these aforementioned patents do not provide a means of cutting high branches on a tree, while the user is standing on the ground or confined to a wheelchair. A further advantage of my invention is that the beveled cutting blade and jaw provide a means of pruning the branch close to the main trunk of the tree or trimming grass close to the ground.

A cutting blade and jaw are pivotally mounted to each other in a crossed scissor type assembly by a stationary fulcrum pin. The outer ends of the cutting blade and jaw are beveled outward from the longitudinal axis of the butt ends of the cutting blade and jaw.

BRIEF DESCRIPTION OF THE DRAWINGS

The objects and features of the invention may be understood with reference to the following detailed description of an illustrative embodiment of the invention taken together with the accompanying drawings in which:

FIG. 1 illustrates a front view of a straight edge long handled shears;

FIG. 2 illustrates a side view of a straight edge long handled shears;

FIG. 3 illustrates a front view of a concave curved long handled cutter;

FIG. 4 illustrates a side view of a concave curved long handled cutter;

FIG. 5 illustrates a front view of the elongated handles of the invention;

FIG. 6 illustrates a front cross sectional view of the cone shaped member of the invention; and FIG. 7 illustrates a front view of the telescoping handle of the invention.

DESCRIPTION OF THE PREFERRED EMBODIMENT

Turning now descriptively to the drawings in which similar reference characters denote similar elements throughout the several views, FIGS. 1-2 show a long handled shears 10 used for the trimming of high and low branches on a tree. The long handled shears 10 comprise a straight edge cutting blade 11 and a straight edge jaw 12 pivotally mounted to each other in a crossed scissor type assembly by a stationary fulcrum pin 13. The first geometrically shaped butt end 14 of the jaw 12 has a double concave shaped inside cutting edge 16. The second geometrically shaped butt end 15 of the cutting blade 11 has a second double concave shaped inside cutting edge 17. An elongated rod member 18 is affixed to the ends of the first and second geometrically shaped butt ends 14. The ends of the elongated rod members 18 are mounted into the open apex end 19 of a cone shaped member 20. Female threads 21 are contained on the inside bottom base periphery 22 of each cone shaped member 20 as shown in FIG. 6. Elongated wooden handles 23 as shown in FIG. 5 have male threads 24 on one end 25 of each handle 23. The elongated wooden handles 23 are detachably mounted into each cone shaped member 20. An ideal length for the elongated wooden handles 23 is 31 inches. The straight edge cutting blade 11 and the straight edge jaw 12 are tapered to pointed outer ends 25, 26. The outer ends 25, 26 of the cutting blade 11 and jaw 12 are beveled below the stationary fulcrum pin 13 at an obtuse angle to the longitudinal axis of the butt ends 14, 15.

A second modification of the long handled cutting instruments are cutters as shown in FIGS. 3-4, wherein the modification comprises a straight cutting edge 27 of the butt end 14 as well as a second straight cutting edge 28 of the second butt end 15. The jaw 12 and cutting blade 11 are of a concave curvative 29 beveled outward in a curved continuum to the longitudinal axis of the butt ends 14, 15. The concave curvative 29 of the jaw 12 and cutting blade are tapered to an outer pointed end 30, 31.

Alternatively, the elongated handles 23 as shown in FIG. 7 can be formed from a cylinder shaped handle section 32 telescopically communicating with a cone engaging section 33.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A long handled shears, which comprises:
   a. a straight edge jaw;
   b. a straight edge cutting blade;
   c. said straight edge jaw pivotally mounted in a crossed scissor type assembly to said straight edge cutting blade with a stationary fulcrum pin;
   d. a geometrically shaped butt end of said straight edge jaw;
   e. a second geometrically shaped butt end of said straight edge cutting blade;
   f. a double concave shaped inside cutting edge of said second butt end;
   g. a second double concave shaped inside cutting edge of said second butt end;
   h. two elongated rod members;
   i. said elongated rod members affixed to the ends of said butt end and said second butt end;
   j. two open ended cone shaped members;
   k. said elongated rod members mounted into an opened apex end of each said cone shaped member;
   l. an inside bottom base periphery of each said cone shaped member;
   m. two elongated handles;
   n. a means of attaching each said elongated handle to said inside bottom base periphery of each said cone shaped member;
   o. said straight edge jaw tapered to a pointed outer end; p. said straight edge cutting blade tapered to a second pointed outer end;
   q. said straight edge jaw beveled below said stationary fulcrum pin at an obtuse angle to a longitudinal axis of said butt end; and
   r. said straight edge cutting blade beveled below said stationary fulcrum pin at an obtuse angle to a second longitudinal axis of said second butt end.

2. A long handled shears as recited in claim 1, wherein each said elongated handle comprises:
   a. a handle section;
   b. a cone engaging section; and
   c. said cone engaging section telescopically engaging said handle section.

3. A long handled shears as recited in claim 2, wherein said means of attaching each said elongated handle to said inside bottom base periphery of each said cone shaped member comprises:
   a. female threads contained on each said inside bottom base periphery of each said cone shaped member;
   b. male threads on a free end of each said cone engaging section of each said elongated handle; and
   c. said cone engaging section of said elongated handle detachably mounted to each said cone shaped member.

4. A long handled shears as recited in claim 1, wherein said means of attaching each said elongated handle to said inside bottom base periphery of each said cone shaped member comprises:
   a. female threads contained on each said inside bottom base periphery of each said cone shaped member;
   b. male threads on one end of each said elongated handles; and
   c. said elongated handles detachably mounted to said cone shaped members.

5. A long handled shears as recited in claim 4, wherein said elongated handle is 31 inches in length.

6. A long handled cutters, which comprises:
   a. a concave curved cutting blade;
   b. a concave curved jaw;
   c. said concave jaw pivotally mounted in a crossed scissor type assembly to said concave curved cutting blade with a stationary fulcrum pin;
   d. a geometrically shaped butt end of said concave curved jaw;
   e. a second geometrically shaped butt end of said concave curved cutting blades;
   f. straight edge inside cutting edge of said butt end;
   g. a second straight edge inside cutting edge of said second butt end;
   h. two elongated rod members;
   i. said elongated rod members affixed to the ends of said butt end and said second butt end;
   j. two open ended cone shaped members;
   k. said elongated rod members mounted into an opened apex end of each said cone shaped member;
   l. an inside bottom base periphery of each said cone shaped member;
   m. two elongated handles;
   n. said elongated wooden handles mounted to said cone shaped members;
   o. said concave curved jaw tapered to a pointed outer end;
   p. said concave curved cutting blade tapered to a second pointed outer end;
   q. said concave curved jaw beveled outwardly below said stationary fulcrum pin from a longitudinal axis of said butt end; and
   r. said concave curved cutting blade beveled outward below said stationary fulcrum pin from a longitudinal axis of said second butt end.

7. A long handled cutters as recited in claim 6, wherein each said elongated handle comprises:
   a. a handle section;
   b. a cone engaging section; and
   c. said cone engaging section telescopically engaging said handle section.

8. A long handled cutters as recited in claim 7, wherein said means of attaching each said elongated handle to said inside bottom base periphery of each said cone shaped member comprises:
   a. female threads contained on each said inside bottom base periphery of each said cone shaped member;
   b. male threads on a free end of each said cone engaging section of each said elongated handle; and
   c. said cone engaging section of said elongated handle detachably mounted to each said cone shaped member.

9. A long handled shears as recited in claim 1, wherein said means of attaching each said elongated handle to said inside bottom base periphery of each said cone shaped member comprises:
   a. female threads contained on each said inside bottom base periphery of each said cone shaped member;
   b. male threads on one end of each said elongated handles; and
   c. said elongated handles detachably mounted to each said cone shaped members.

10. A long handled cutters as recited in claim 9, wherein said elongated handle is 31 inches in length.

* * * * *